United States Patent Office 2,716,014
Patented Aug. 23, 1955

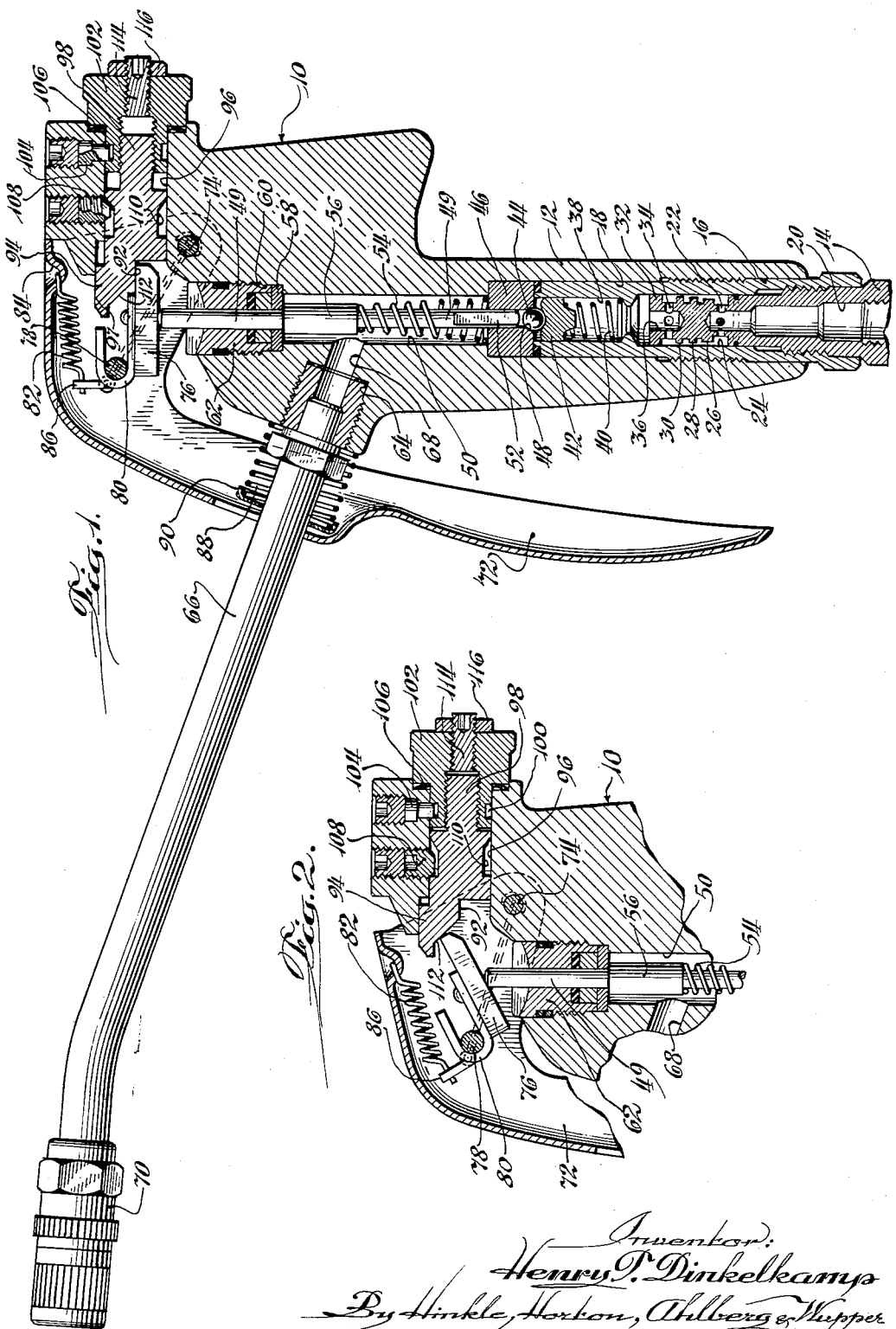

2,716,014

CONTROL VALVE FOR LUBRICATING APPARATUS

Henry T. Dinkelkamp, Chicago, Ill., assignor to Stewart-Warner Corporation, Chicago, Ill., a corporation of Virginia Application December 21, 1950, Serial No. 201,911

2 Claims. (Cl. 251—64)

This invention relates to a control valve which is particularly useful in connection with lubricating apparatus.

An object of the invention is to provide a novel control valve for delivering a single charge or shot of a fluid lubricant in response to each operation of the valve.

A further object is to provide such a control valve having means for adjusting the quantity of lubricant supplied in each charge.

A further object is to provide such a control valve which is adjustable for supplying a continuous flow of lubricant rather than a single charge.

A further object is to provide a control valve which will give dependable service over a long, useful life.

A still further object is to provide a control valve which is particularly rugged, simple and economical.

Further objects, advantages, and features of the invention will be apparent from the following description of an illustrative embodiment of the invention, taken in connection with the drawing in which:

Fig. 1 is a central side sectional view of the embodiment; and

Fig. 2 is a fragmentary sectional view similar to Fig. 1 illustrating changes in the positions of some of the operating parts.

The illustrative control valve has a body member 10 including a downwardly projecting handle or grip 12. A fitting 14 provides an inlet conduit for receiving lubricant under pressure. The fitting is threaded into a bushing 16 which is threaded into a bore 18 extending upwardly from the bottom of the handle 12.

The fitting 14 has an inlet bore 20 which communicates through a number of radial passages 22 with a bore 24 in the bushing 16. Three external annular ridges 26, 28 and 30 on the fitting 14 above the radial passages 22 provide means for filtering the lubricant which enters the control valve. The ridges 26, 28 and 30 progressively fit the bore 24 more closely. The diameters of the ridges may be about thirty-five, twenty-five and fifteen thousandths of an inch less, respectively, than the diameter of the bore 24, for example. For purposes of illustration the clearances are greatly exaggerated in the drawing.

A fourth ridge 32 at the top of the fitting 14 has a close sliding fit with the bore 24. This ridge acts as a scraper to remove accumulated foreign particles when the fitting 14 is withdrawn from the bushing 16. Lubricant passes around the ridge 32 into the upper end of the bore 24 through radial passages 34 and an axial passage 36 in the fitting 14.

The upper end of the bore 24 communicates with the lower end of a bore passageway 38 which houses a valve spring 40 compressed between the lower end of the bore 38 and a ball carrier 42. The ball carrier 42 may be square or polygonal to permit free passage of the lubricant between the carrier and the bore 38.

A valve stopper in the form of a ball 44 is carried on the upper surface of the ball carrier 42. The valve ball 44 is urged upwardly by the spring 40 toward a bushing 46 having a downwardly facing valve seat 48. The fitting 14 and the bushing 16 are suitably packed to prevent leakage of lubricant.

The lower end of a flow control plunger or thrust member 49 extends downwardly through a bore or passageway 50 in the valve body and into the bushing 46 above the ball 44. The plunger has a flat surface 52 to permit lubricant to flow through the bushing 46 around the lower end of the plunger. There may be slight clearance between the ball 44 and the lower end of the plunger 49 to insure accurate seating of the ball.

A coil spring 54 positioned in the bore 50 is compressed between the upper surface of the bushing 46 and the lower end of an annular abutment 56 on the plunger having a diameter greater than the lower portion of the plunger. Upward movement of the plunger 49 is limited by engagement of the upper end of the abutment 56 with a washer 58 retained in a bore 60 by means of a suitably packed bushing 62 threaded into the bore 60. The upper end of the plunger 49 extends upwardly through the bushing 62.

An outlet conduit 66 is connected with an inclined bore 64 which communicates with the bore 50 through a passage 68. The outlet conduit 66 terminates in a coupler 70 for detachably connecting the outlet conduit with a device that is to be supplied with lubricant.

The valve has an operating lever 72 which is generally U-shaped in cross-section and which is connected with the valve body 10 by a pivot 74 extending transversely through the upper end of the valve body immediately to the rear of the bore 60.

A latching bar or rocker bar 76 is connected with the operating lever 72 by means of a transverse pivot 78. A U-shaped bracket 80 secured to the upper surface of the latching bar 76 is hooked around the front of the pivot 78 to form an elongated guide for the latching bar. The outer curved end of the bracket 80 forms an abutment which is engaged by the pivot 78 during opening movement of the operating lever. A coil spring 82, hooked between a spring ear 84 on the operating lever and an upwardly extending lug 86 on the U-shaped bracket 80, urges the bracket 80 rearwardly. The spring 82 tends to rotate the bracket clockwise and to urge the latching bar 76 into engagement with the upper end of the control plunger 49.

A spring 88 coiled around the outlet conduit is compressed between the valve body 10 and a retaining cup 90 which engages the operating lever 72. The spring 88 urges the operating lever in a clockwise direction.

The rear upper edge of the latching bar 76 normally engages a horizontal anchor ledge surface 92 on an adjustable fulcrum 94. The rear portion of the fulcrum 94 is slidably positioned in a horizontal bore 96 extending through the upper portion of the valve body 10. The fulcrum has a flat upper surface 97 which engages a complementary surface on the valve body to prevent rotation of the fulcrum 94 in the bore 96. A stem 98 extending from the rear of the fulcrum 94 is threaded into an adjusting screw 100 positioned in the bore 96 and enlarged at its rear end to form a knob 102. The adjusting screw 100 is rotatable in the bore 96 but is restrained against sliding movement by a pin 104 which engages an external groove in the adjusting screw. A spring washer 106 is positioned between the knob 102 and the valve body 10 to provide frictional resistance to rotation of the knob.

A setscrew 108 limits sliding movement of the fulcrum 94 in the bore 96 by engaging the opposite ends of an external groove 110 on the fulcrum. The fulcrum has a diagonal guide surface 112 which slopes upwardly and forwardly from the horizontal surface 92.

An axial setscrew 114 extending through the knob 102 provides an adjustable rear stop which is engageable with the stem 98 on the fulcrum 94. The setscrew 114 is maintained in adjustment by a locknut 116.

In the operation of the control valve the inlet fitting 14 may be connected with a source of lubricant under pressure by means of a hose, not shown. Before the operating lever 72 is moved, the ball 44 is retained on its seat 48 by lubricant pressure acting on the lower face of the ball and by the spring 40.

When the operating lever 72 is pulled rearwardly against the force of the spring 88, the pivot 78 which carries the latching bar 76 is moved arcuately forwardly and downwardly. The front end of the latching bar 76 moves downwardly with the pivot 78, but the rear upper edge of the latching bar fulcrums on the horizontal fulcrum surface 92. Consequently the latching bar 76 forces the plunger 48 downwardly against the resistance of the spring 54 to engage the ball 44.

The force exerted on the lower face of the ball 44 by the high pressure lubricant in the inlet conduit 14 provides considerable resistance to unseating of the ball, and a relatively great force must be exerted on the lever 72 to open the valve. When the valve ball has been unseated, the inlet lubricant pressure is applied to all sides of the ball and the net force on the ball is greatly reduced. Consequently the movement of the lever is completed with a sudden snap. The lubricant flows around the ball through the bore 50 and the passage 68 to the outlet conduit 66.

In Fig. 1 the fulcrum 94 is adjusted to the front extreme of its range of movement. This position of the fulcrum provides continuous flow of lubricant when the operating lever 72 is moved. The forward movement of the pin 78 draws the latching bar forwardly on the fulcrum surface 92, but the movement is insufficient to disengage the bar 76 from the surface 92.

When a single charge of lubricant is to be delivered in response to each operation of the operating lever 72, the fulcrum 94 is moved rearwardly by turning the knob 102. In Fig. 2 the fulcrum is shown adjusted to a position adjacent its rear extreme of movement. When the fulcrum is adjusted for delivery of a single charge, the valve ball 44 is disengaged from its seat 48 by the plunger 49 during the first portion of the movement of the operating lever 72. When the movement of the lever is completed with a snap, the operating lever pulls the latching bar 76 forwardly so that it disengages the horizontal fulcrum surface 92. The spring 54 pushes the plunger 49 upwardly and the plunger carries the bar 76 upwardly against the inclined surface 112 on the fulcrum 94 as illustrated in Fig. 2. The upward movement of the plunger 49 permits the valve ball 44 to shut off the flow of lubricant by engaging its seat 48. The spring 82 urges the latching bar 76 downwardly against the top of the plunger 49 but the strength of the spring 82 is insufficient to move the plunger 49.

When the operating lever 72 is released, the spring 82 forces the rear upper edge of the latching bar 76 downwardly and rearwardly along the inclined surface 112. During this movement the pin 78 may move a short distance rearwardly in the U-shaped bracket 80. When the operating lever 72 has fully returned to its normal position illustrated in Fig. 1 the spring 82 slides the rear upper edge of the latching bar 76 rearwardly under the horizontal fulcrum surface 92 so that the latching bar assumes its starting position as illustrated in Fig. 1.

The size of the single charge of lubricant delivered by the valve may be adjusted by changing the position of the fulcrum 94. When the fulcrum is adjusted to its rear extreme of movement as illustrated in Fig. 2, the charge has a minimum size. Moving the fulcrum forwardly by turning the knob 102 increases the size of the charge because the latching bar 76 moves farther forward during the operation of the lever 72 before disengaging the fulcrum surface 92.

The snap action of the operating lever 72 described above insures accurate charge measurement when the valve is adjusted for delivering single shots. It is virtually impossible to unseat the valve ball 44 without completing the movement of the lever 72 with a snap to disengage the latching bar from the fulcrum and thereby to close the valve.

The setscrew 114 provides an abutment for adjusting the rear extreme of movement of the fulcrum 94. The adjustment of the setscrew determines the minimum charge of lubricant by limiting the minimum travel of the latching bar 76 on the fulcrum surface 92.

The valve has a long operating life because those surfaces which slide on one another have large engaging areas to minimize wear. This particularly applies to the rear upper surface of the latching bar 76 and the fulcrum surface 92.

A particularly simple, rugged and compact construction results from providing an adjustable fulcrum cooperating with a movable latch which has a nonadjustable relationship with the operating lever. Constructional complications are entirely absent from this combination.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. A hand valve for passing fluid either in discrete charges or in a continuous flow, comprising, in combination, a valve body defining a passageway therethrough, a reciprocable member for controlling the flow of fluid through the passageway, a fulcrum member slidably mounted in the valve body near the outer end of the control member for movement forward and away from the latter, the fulcrum member defining an anchor ledge at one side of the control member, an operating lever pivoted to the valve body and shaped to have a portion thereof on the side of the control member opposite from the anchor ledge movable away from the latter as an incident to opening movement of the lever, a transverse pivot member mounted in said lever portion, a rocker member extending transversely across the outer end of the control member and having one end adapted for slidable engagement with the anchor ledge, means on the rocker member defining an elongated guide slidably engageable with the pivot member and an abutment at the end of the guide remote from the anchor ledge positioned for engagement with the pivot member, a spring interconnected with the rocker member for urging the latter toward the fulcrum member to an extent limited by engagement of the abutment with the pivot member, the rocker member being effective to transmit opening movement of the operating lever to the control member until the rocker member is pulled off the anchor ledge by the pivot member acting on the rocker member abutment, the rocker member and the fulcrum member being shaped to return the rocker member to slidable engagement with the anchor ledge under the force of said spring as an incident to return movement of the operating lever, and adjusting means interconnected between the valve body and the fulcrum member for adjusting the latter toward and away from the control member to regulate the degree of movement of the operating lever required to disengage the rocker member from the anchor ledge.

2. A hand valve for passing fluid either in discrete charges or in a continuous flow, comprising, in combination, a valve body defining a passageway therethrough, a reciprocable member for controlling the flow of fluid through the passageway, a fulcrum member slidably mounted in the valve body near the outer end of the control member for movement forward and away from the latter, the fulcrum member defining an anchor ledge at one side of the control member, an operating lever pivoted to the valve body and shaped to have a portion thereof on the side of the control member opposite from the anchor ledge movable away from the latter as an incident to opening movement of the lever, a rocker member extending transversely across the outer end of the control member and having one end adapted for slidable engagement with the anchor ledge, means pivoting the rocker member to said operating lever portion, a spring interconnected with the rocker member for urging the latter toward the anchor ledge to an extent limited by the pivotal connection between the rocker member and the operating lever, the rocker member being effective to transmit opening movement of the operating lever to the control member until the rocker member is pulled off the anchor ledge by the operating lever, the rocker member and the fulcrum member being shaped to return the rocker member to slidable engagement with the anchor ledge under the force of said spring as an incident to return movement of the operating lever, a first adjusting member on the fulcrum member, a second adjusting member threaded on the first adjusting member and rotatably connected to the valve body for moving the fulcrum member toward and away from the control member, and an abutment threaded into one of the adjusting members for engagement with the other adjusting member to limit outward movement of the fulcrum member, the outer end of the abutment being uncovered for convenient rotation.

References Cited in the file of this patent

UNITED STATES PATENTS

| | | |
|---|---|---|
| 1,733,441 | Barks | Oct. 29, 1929 |
| 2,543,649 | Wales et al. | Feb. 27, 1951 |
| 2,643,678 | Paradise | June 30, 1953 |